United States Patent [19]

Teets et al.

[11] Patent Number: 5,687,762
[45] Date of Patent: Nov. 18, 1997

[54] FUEL FILL AND VAPOR VENTING VALUE UNIT FOR FUEL TANKS

[75] Inventors: Michael R. Teets, Grosse Pointe Park; Jacquelyn C. Rocca, Madison Heights, both of Mich.

[73] Assignee: Chrysler Corporation, Auburn Hills, Mich.

[21] Appl. No.: 531,504

[22] Filed: Sep. 21, 1995

[51] Int. Cl.[6] ............................................. F16K 24/00
[52] U.S. Cl. ..................... 137/588; 141/59; 141/347; 141/302
[58] Field of Search ................... 137/587, 588, 137/625.18, 595; 141/59, 290, 347, 302, 46

[56] References Cited

U.S. PATENT DOCUMENTS

| | | | |
|---|---|---|---|
| 3,981,325 | 9/1976 | Robinson | 137/587 |
| 4,320,788 | 3/1982 | Lord | 137/587 |
| 4,706,708 | 11/1987 | Fornuto et al. | 137/588 |
| 4,730,652 | 3/1988 | Bartholomew | 137/588 |
| 4,809,865 | 3/1989 | Mori et al. | 220/86 R |
| 4,811,718 | 3/1989 | Sonoda | 137/588 |
| 4,955,950 | 9/1990 | Seiichi et al. | 141/46 |
| 5,103,877 | 4/1992 | Sherwood et al. | 141/59 |
| 5,183,087 | 2/1993 | Aubel et al. | 141/59 |
| 5,186,220 | 2/1993 | Scharrer | 141/59 |

*Primary Examiner*—Denise L. Ferensic
*Assistant Examiner*—Ramyar M. Farid
*Attorney, Agent, or Firm*—Kenneth H. MacLean

[57] ABSTRACT

A valved unit to control introduction of liquid fuel and venting of vaporous fuel relative to a vehicle fuel tank which unit is mounted on to the tank wall to effectively seal and isolate the tank downstream from a filler tube and related fuel delivery hoses. Tank closure is normally maintained by a closure spring which is overcome by introduction of fuel into the tank which allows movement of the inlet closure valve from its seated closed position and simultaneously opens an associated vaporous fuel vent control valve. When introduction of fuel is terminated, a spring returns the two valve elements back to their closed and sealed positions.

4 Claims, 3 Drawing Sheets

FUEL FILL AND VAPOR VENTING VALUE UNIT FOR FUEL TANKS

FIELD OF INVENTION

The invention relates to fluid control valve for a vehicle fuel tank, and more particularly, to a new and improved multiple valve unit with interconnected, normally closed vapor venting and liquid fuel fill valves that automatically open in response to the introduction of fuel to the tank and subsequentially close when the introduction of fuel is terminated.

DESCRIPTION OF RELATED ART

Prior to the present invention, various valve arrangements have been devised to control the introduction of liquid fuel into vehicle tanks and to control venting of fuel vapors from such tanks. For example, U.S. Pat. No. 4,706,708, issued Nov. 17, 1987, to Fornuto et al, and U.S. Pat. No. 4,809,865, issued Mar. 7, 1989 to Mori et al disclose closure valves operatively mounted in fuel fill tubes leading to fuel tanks and so arranged so that the nozzle of a fuel pump opens a closure valve and a vent valve to permit the supply of volatile liquid fuel into the tank and the resultant exhaust of fuel vapor therefrom.

While such constructions may be effective for their stated and intended purposes, they do not meet higher standards for improved fuel and fuel vapor control valves for direct use in fuel tanks. In particular, they do not rapidly control and contain fuel and fuel vapors which are within the confines of the fuel tank, nor control the substantially unrestricted delivery of fuel into the tank by providing a valve unit with a direct interconnection of the liquid fuel and fuel vapor control valves in an integral module adapted for assembly to a fuel tank.

SUMMARY OF THE INVENTION

In contrast to prior constructions, the present invention is drawn to a new and improved modular valve unit for integration with a fuel tank for the purpose of satisfying high liquid fuel and vapor fuel control standards by use of interconnected liquid fuel feed and vaporous fuel control valves mounted directly to the fuel tank downstream of the filler tube for effectively sealing the tank's liquid fuel feed and vaporous fuel exhaust at varying internal tank pressures during non-refueling periods and also for automatically relieving gas tank pressure during refueling.

In this invention, a toggle type linkage interconnects a liquid fuel feed or intake valve and a vaporous fuel exhaust valve so that the introduction of liquid fuel into the tank will automatically cause the opening of the liquid fuel feed and vaporous fuel exhaust valves. The unit features a pair of valve elements which control the openings for introduction of liquid fuel and for relief of vaporous fuel. One of these elements or valves is influenced by a closure spring with a known force to rapidly effect sealing of the fuel tank within the tank wall and also rapidly closing and sealing the tank by means of the vaporous fuel exhaust valve after termination of the filling of the tank with liquid fuel. The configuration of the valve can be varied or the characteristics of the closure spring varied for adjustment of the tank sealing characteristics to meet specific standards or suit specific requirements.

More particularly, in this invention, incoming fuel impacting upon the liquid fuel control valve and thus against the force of the associated spring displaces the liquid fuel valve away from its closure seat so that the liquid fuel can freely flow through the unit into the interior of the fuel tank. When the liquid fuel valve is displaced, an associated linkage or mechanical mechanism simultaneously displaces a vaporous fuel vent valve from a closure seat to an opened operative position so that fuel vapors can flow to an exhaust passage. The vaporous fuel may then be passed to the filler tube and to a charcoal filled canister for temporary storage. Subsequently, the vaporous fuel may be feed into the combustion chambers of the associated engine of the vehicle. After introduction of fuel is completed, the closure spring returns the liquid fuel valve and the vaporous fuel vent valve to a closed operative position whether or not the nozzle of the fuel pump remains in the filler tube.

The fuel filler tube, vent tube, and associated hoses attached to "spuds" or nipple-like fittings of the subject valved unit. Except during actual filling of the tank with liquid fuel, both the liquid fuel and the vaporous fuel vent passages are closed at the boundary of the fuel tank so that damage which adversely effects the integrity or parting of the fuel filler, vent tubes, and their associated hoses will not provide leak paths from the tank. Accordingly, these tubes and related components will not serve as escape passages for liquid fuel and fuel vapors which are confined in the tank. With this invention, an increase of fuel tank pressure, such as might result from increased fuel temperatures, will not effect operation of the valved unit since the closure and venting valves are substantially balanced to readily open and release under such higher pressures. The invention further provides improved valving with integrated fuel tank spuds or nipples to which fuel feed and the vapor discharge hoses can be readily attached.

The subject valved unit does not impede the flow of fuel or impose an inhibiting feed path to restrict the introduction of fuel into the tank. The configurations of the valve seals and spring force are selected for valve control and valve balancing to eliminate development of high fuel tank or filler tube pressures. Importantly, in this invention during periods when fuel is not being introduced into the tank, there is improved positive sealing of the tank. However, when the fuel is being fed into the tank, the valves automatically open so that the tanks can be filled with fuel and the vapors exhausted therefrom. On termination of the fuel feed, the supply and vent valves quickly close to again seal the tank prior to nozzle removal.

Preferably, in the present invention, the valved unit and the fuel tank both of plastic material suitable for use with engine fuels, such as gasoline, and which can be readily fused or "welded" together into a valve and tank assembly.

These and other features, objects, and advantages of this invention will become apparent from the following detailed description and drawing in which:

DETAILED DESCRIPTION OF THE DRAWINGS

Figure 1:
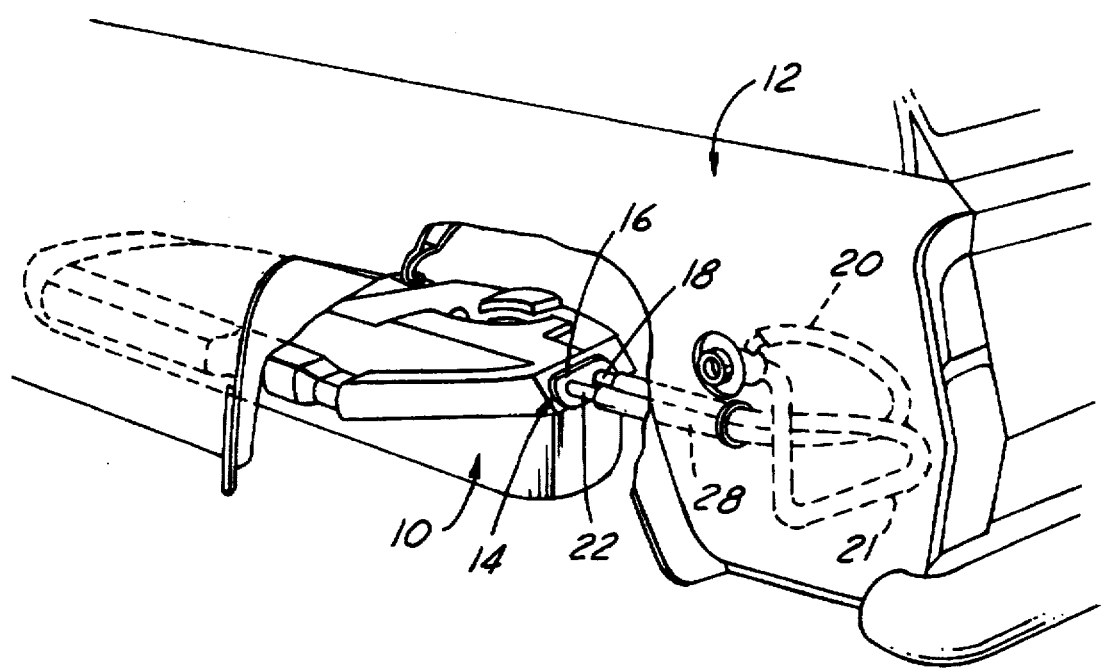
FIG. 1 is a pictorial view of a fuel tank in a vehicle integrated with the valved unit of this invention.
Figure 2:
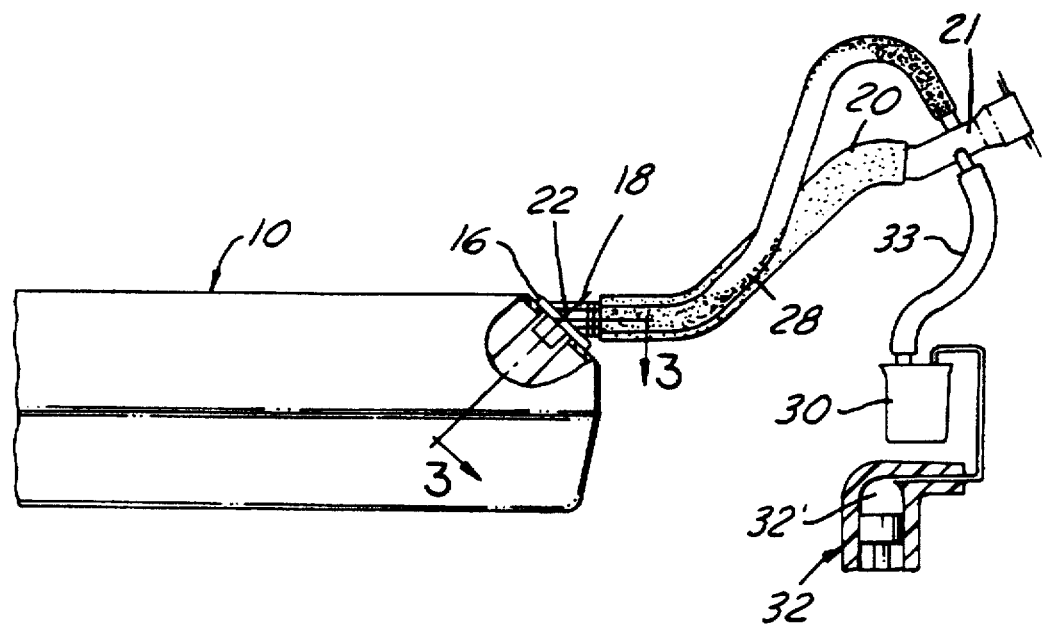
FIG. 2 is an elevational and somewhat diagrammatical view of a portion of the tank and valve unit of FIG. 1 and with fuel vapor controls added.
Figure 3:
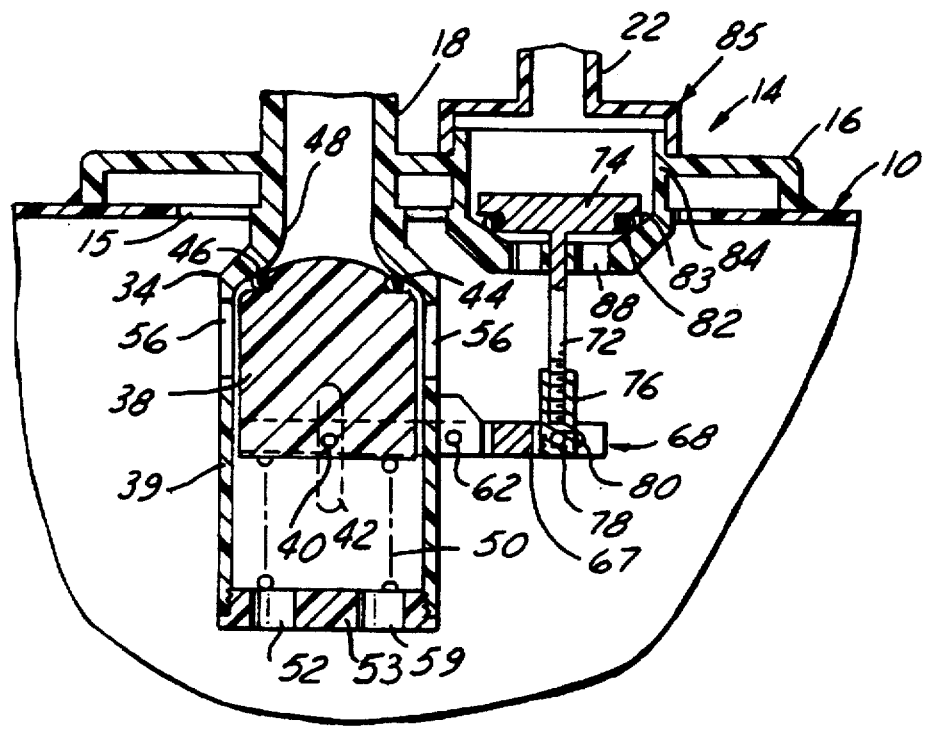
FIG. 3 is a cross-sectional view of the valved unit of FIG. 1 showing the valves in a normal closed position.
Figure 4:
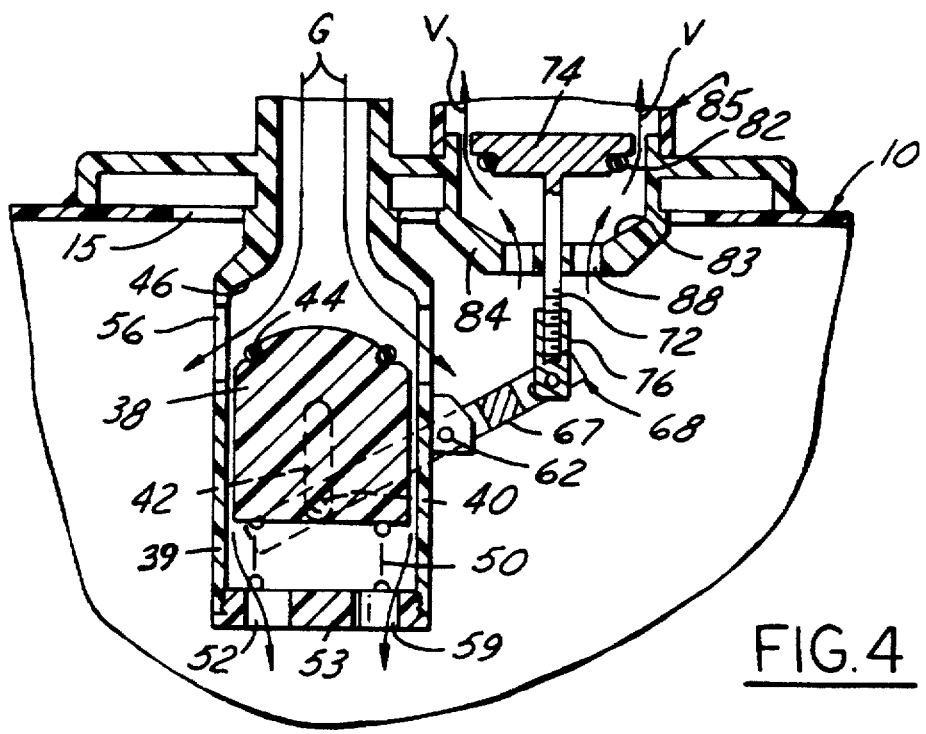
FIG. 4 is a cross-sectional view of the valve unit of FIG. 1 showing the valves moved to an opened position such as during introduction of liquid fuel to the tank.

Turning in greater detail to the drawings, specifically FIG. 1, a fuel tank 10 is shown which is molded from suitable thermoplastic material, such as a nylon or high-density polyethylene having good endurance and retention of mechanical properties at elevated temperatures and good resistance to chemicals such as gasoline. The tank is operatively mounted in a vehicle 12 and has a valved unit 14 for controlling flows of liquid fuel into and vaporous fuel out of the tank. The valved unit 14 is substantially made of thermoplastic material similar to the tank 10. As best seen in FIGS. 3-4, the lower end portion of valved unit 14 extends through opening 15 in the wall of the tank 10. The valved unit 14 further has an enlarged base plate 16 which is heat welded or fused to the wall of tank 10 and is formed with an outwardly extended liquid fuel inlet nipple or spud 18. Referring back the FIG. 2, the inlet nipple 18 is adapted to be connected to a flexible supply hose or tube 20 which in turn is connected to a stationary fuel feed or filler tube 21.

Looking to FIGS. 3-4 again, a vent or exhaust nipple (spud) 22 for vaporous fuel is formed by base plate 16 adjacent to the inlet or fill nipple 18. Referring back to FIG. 2, the vent nipple 22 is connected to a flexible vapor exhaust or vent tube 28 that preferably is connected to the interior of the upper portion of the filler tube 21. Another conduit 33 connects the interior of the filler tube to an on-board vapor storage canister 30. Canister 30 is provided to temporarily store vaporous fuel and subsequently introduce that vaporous fuel to the combustion chambers 32' (only one shown) of an internal combustion engine 32 of the associated vehicle. If the above described vapor control is not utilized, vaporous fuel may be vented back into another area such as into the fuel feed or filler tube 21.

As best shown in FIG. 3, the liquid fuel inlet nipple 18 opens into the interior of a hollow, bottle-shaped valve housing 34 formed integrally with and extending from the base plate 16 into the interior of the fuel tank. An inlet valve element 38 is loosely mounted in a cylindrical body 39 of the housing 34 so as to be capable of linear movement therein. A radially outwardly projecting guide pin 40 extends from the valve element 38 through vertical oriented guide slots 42 which are formed in the cylindrical wall of housing 34 to guide the movement of valve 38 in housing 34. The upper end of the valve element 38 mounts an annular elastomeric seal member 44 which sealingly engages an annular valve seat surface 46 formed internally in the reduced diameter neck portion 48 of the housing 34 when the valve 38 is in the closed position, as shown in FIG. 3. A helical spring 50 is operatively disposed between the lower end surface of valve element 38 and a spring seating support surface formed by the upper surface of an end closure 53 of the housing 34. The spring 50 yieldably urges the valve element 38 into the closed sealing position shown in FIG. 3.

The end closure 53 is threadably attached to the housing 34 and is rotated to adjust its position relative to the valve element 38, thus adjusting the spring force on the valve. The housing 34 and its closure end 53 have openings 52 and 59, respectively, which permit the unrestricted flow of liquid fuel into tank 10 as illustrated by flow arrows G.

Figure 5:
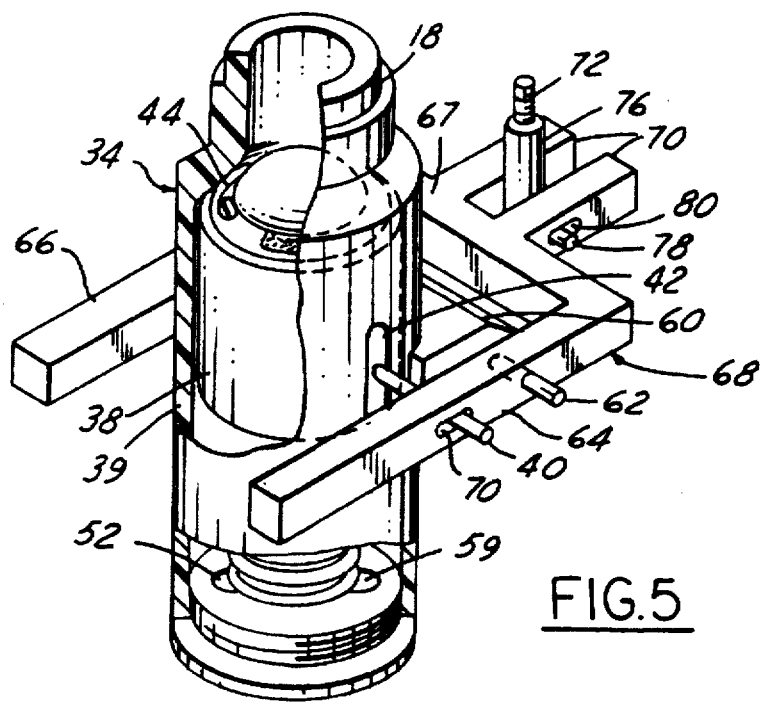
FIG. 5 is a pictorial view of the valve units of FIGS. 3 and 4.

As best shown in FIG. 5, a support plate member 60 is attached to the side of valve housing 34. Member 60 supports a transversely extending pivot shaft 62. Left and right side legs 64, 66 of a bifurcated lever member 68 are pivotally supported on shaft 62. The legs 64, 66 are also provided with horizontally oriented slots 70 which receive end portions of the pin 40 which extends radially away from the valve element 38. As the valve element 38 moves downward due to the impact of liquid fuel flow G as shown in FIG. 4, the outward ends of pin 40 pushes legs 64, 66 downward as the pin moves along slot 70. Thus, the member 68 is pivoted about the axis of pivot support pin 62.

The legs 64, 66 of lever member 68 straddle the cylindrical body portion 39 of the housing 34. A common cross-portion 67 of member 68 connects the base of legs 64, 66. From cross-portion 67, a pair of spaced connector members 70 extend laterally therefrom to either side of a cylindrical collar member 76. Member 76 is itself attached to a stem portion 72 of a second valve element 74 as shown in FIGS. 3, 4. The members 70 and cylindrical collar member 76 are operatively connected in a manner shown in FIGS. 3 and 4. More particularly, the lower end of stem 72 is threaded or otherwise connected to the cylindrical collar 76 which extends between the members 70. A pivot pin 78 engages slots 80 in the spaced connector members 70 to operatively attach collar member 76 to the lever member 68.

Referring specifically to FIGS. 3 and 4, the second valve member 74 has an inward facing end surface with an elastomeric seal 82 supported thereon. When in a closed operative position, seal 82 is adapted to engage a tapered annular sealing surface 83 formed in the cup-shaped valve housing 84. Housing 84 supports a cap member 85 to form the fuel vapor venting nipple 22 located above the valve element 74. Below the valve element 74, holes 88 are formed in the bottom portion of the valve housing 34 located inboard of the annular seal 82. This allows passage of fuel vapors from the interior of the tank into vent nipple 22 and to vent conduit 28 whenever the valve element 74 is moved upward to the opened position shown in FIG. 4. In FIG. 4, resultant fuel vapor flow past valve 74 is labeled by arrows V.

The downward movement of the liquid fuel valve element 38 away from valve seat 46 in response to the introduction of fuel through the filler tube 20 causes lever member 68 to rotate counterclockwise in FIG. 3 about pivot pin 62. This moves the vapor exhaust valve element 74 upwardly and to an opened position, as shown in FIG. 4. When this occurs, liquid fuel is supplied into tank 10 through side openings 56 in the housing 34 and simultaneously the tank's interior is opened to the fuel vapor exhaust tube or vent passage 28 so that the fuel vapors in the tank can flow to the fuel filler tube and then into the vapor control system such as the canister 30. Subsequently, the vapor flows to the combustion chambers 32' of the associated engine. Accordingly, in the open position of the valved device 14, vapors escape and there is no entrapment and build-up of fuel vapor pressure in the tank.

When liquid fuel is first introduced into the filler tube 20 by a delivery nozzle, the valved device instantly opens. When the flow of liquid fuel stops, the impact of fuel on the upper end of the valve terminates and the force of spring 50 returns the closure valve element 38 and the vent valve element 72 to their closed sealed positions. Resultantly, the interior of the tank is sealed at its boundary or outer wall. It will be appreciated that this sealing effect occurs when the flow of liquid fuel stops which is before the fuel delivery nozzle is removed from the fuel filler tube 21. Also, if the fuel filler tube 21, supply hose 20, or vent tube 28 are open to atmosphere, liquid and vaporous fuel are prevented from escaping from the tank's interior by valve elements 38, 74 being in a closed operational position.

Figure 6:
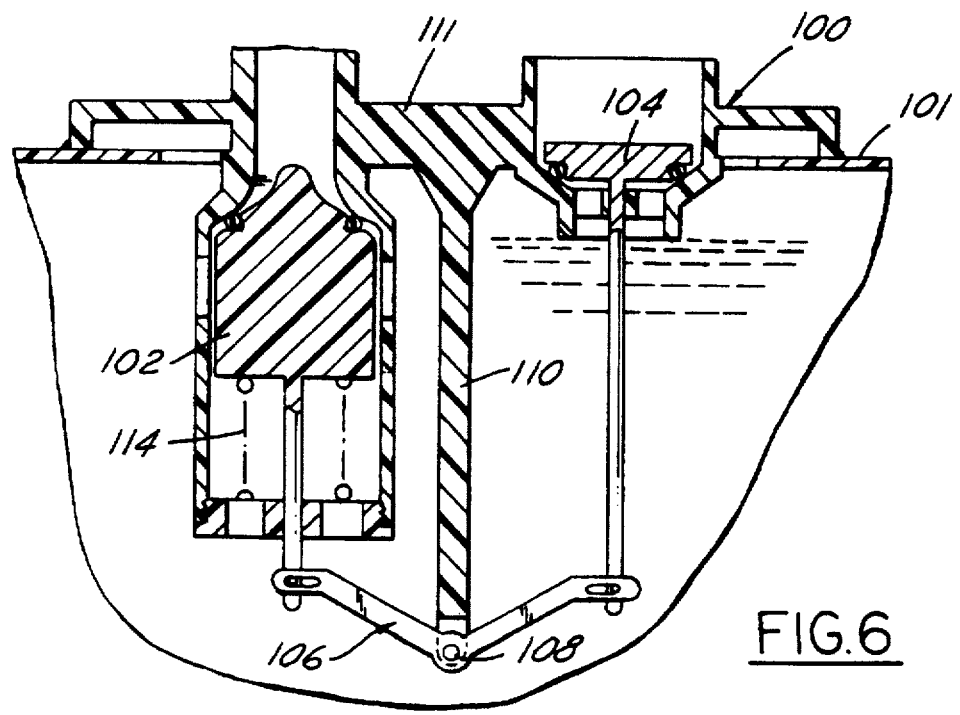
FIG. 6 is a sectioned elevational view of a second preferred embodiment of this invention.

Turning now to the second embodiment 100 shown in FIG. 6, the same general arrangement of valves are provided for a liquid fuel inlet and a vaporous fuel outlet. Valved unit 100 is operatively attached to fuel tank 101. The liquid fuel inlet valve 102 and the vaporous fuel vent valve 104 are alike those of the embodiment shown in FIGS. 1–5 but are interconnected by a simplified crank or toggle type linkage 106. The linkage 106 is pivotally supported by a pivot pin 108 attached at the lower end of a support member or arm 110 which depends from base plate 111.

When the liquid fuel fill valve element 102 is opened in response to the impact by the entry of liquid fuel, the vaporous fuel vent valve 104 is displaced axially upward to an opened position. This allows fuel vapor to flow past valve 104 and to exit the tank. When fuel delivery is terminated, a spring 114 quickly expands to move valve element 102 to its closed and sealed position, shown in FIG. 5. Simultaneously, the linkage 106 rotates clockwise to move valve 104 downward into its closed and sealed position.

In the event that the tank has been filled and there is damage to connector tubing or to the fuel feed and the fuel vapor exhaust nipples, the tank will be sealed to inhibit any substantial loss of fuel.

In each of the two designs, spring forces and the sizing of the valve elements and their seals can be selected so that "corking" or self-sealing of the tank caused by high internal pressures will not occur. With the subject valved device, internal forces on the venting valve decreases its opening characteristics as compared to the opposing closing force exerted on the the liquid fuel inlet valve which tends to increase its opening characteristics. Accordingly, by balancing the forces on the valves, a tenancy to prevent opening of the device during introduction of liquid fuel is eliminated.

While a preferred embodiment of the invention has been shown and described, other embodiments will now become apparent to those skilled in the art. Accordingly, this invention is not to be limited to that which is shown and described but by the following claims.

What is claimed is:

1. A fuel fill and vapor venting valve unit for a tank liquid fuel comprising a base plate directly attached to said tank, said base plate having a first valve housing extending therefrom disposed within the tank, the housing includes a fuel inlet which routes liquid fuel into the tank through said housing, a first valve element operatively mounted within said housing for movement between a closed position in said housing so that said liquid fuel is confined within the tank and an open position in said housing so that liquid fuel can be added into the tank through said fuel inlet and said housing, and spring means operatively mounted within said housing for urging said valve element to said closed position and for yielding in response to displacement of the valve element from the closed position to an open position by the force of liquid fuel exerted thereon when routed into the tank through said inlet and said housing, said base plate further having a second valve housing extending therefrom in side-by-side disposition within the tank with respect to said first valve housing, a second valve element mounted within the second housing movable between an open position in which the tank is vented and a closed position in which said tank is closed, a linkage lever pivotally mounted within said tank operatively interconnecting said valve elements to one another so that the opening of said first valve element from the force of liquid fluid being routed into said tank effects the opening of said second valve element and the subsequent closure of said first valve element effects the closure of said second valve element.

2. The valve unit of claim 1, wherein said first valve element has an outer surface and a fluid seal member associated therewith, said first valve element being moved to a fluid sealing and closed position with respect to said first valve housing by said spring means in response to the termination of the supply of fuel routed into the fuel tank through first valve housing.

3. A liquid fuel fill and vapor venting valve unit for a fuel tank, said unit comprising a base plate attached to said tank, a liquid inlet and a first valve housing providing a first passage extending through said base plate which conducts liquid fuel into the interior of said tank, a fuel vapor vent and a second valve housing disposed in a side-by-side relationship with respect to said first valve housing to provide a second passage extending through said base plate which conducts vapors emanating from said liquid fuel in said tank to the exterior thereof, a first valve member operatively mounted in said first valve housing for movement between a closed position in which fuel is confined within the tank and an open position in which liquid fuel can be fed into the tank through said first passage, a second valve member operatively mounted in said second valve housing for movement between a closed position in which fuel vapors are confined within the tank and an open position in which fuel vapors can escape from the tank, and a linkage lever pivotally mounted on said first housing and operatively interconnecting said valve members to one another so that movement of said first valve member from said closed to said open position in response to the supply of liquid fuel through said first passage moves said second valve member from said closed to said open position.

4. A fuel fill and vapor venting valve unit for a liquid fuel tank, said valve unit having a support base attached to said tank with a fuel inlet and a first housing fixed thereon which provides a fuel intake passage extending into the interior of the tank, and further having a fuel vapor exhaust and a second housing fixed thereon and in an adjacent side-by-side relationship with respect to said fuel inlet and first housing which vents fuel vapors from said tank, and a first valve member operatively mounted in said first housing for movement from a closed position to an open position in response to the supply of fuel into said fuel inlet and for movement from said open position to said closed position when said supply of fuel is terminated, a second valve member operatively mounted in said second housing for movement between open and closed position, at least one spring associated with one of said valve members urging both of said valve members to said closed position, and a linkage lever pivotally supported and configured for turning movement within said tank and operatively connecting said valve members to one another so that when said first valve member opens in response to the supply of fuel thereto said second valve member opens to vent said tank.

* * * * *

UNITED STATES PATENT AND TRADEMARK OFFICE
CERTIFICATE OF CORRECTION

PATENT NO. : 5,687,762
DATED : November 18, 1997
INVENTOR(S) : Teets, et al

It is certified that error appears in the above-identified patent and that said Letters Patent is hereby corrected as shown below:

On the title page, item [54] and column 1, line 1, delete "VALUE" and insert therefore -- VALVE --.

Signed and Sealed this

Third Day of February, 1998

BRUCE LEHMAN

*Attest:*

*Attesting Officer*   *Commissioner of Patents and Trademarks*